(12) United States Patent
Hsieh et al.

(10) Patent No.: US 9,164,196 B2
(45) Date of Patent: *Oct. 20, 2015

(54) PHOTOSENSITIVE RESIN COMPOSITION FOR A COLOR FILTER AND USES THEREOF

(71) Applicant: CHI MEI CORPORATION, Tainan (TW)

(72) Inventors: Bar-Yuan Hsieh, Tainan (TW); Jung-Pin Hsu, Tainan (TW); Bo-Hsuan Lin, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 120 days.

This patent is subject to a terminal disclaimer.

(21) Appl. No.: 13/887,840

(22) Filed: May 6, 2013

(65) Prior Publication Data

US 2013/0299755 A1  Nov. 14, 2013

(30) Foreign Application Priority Data

May 10, 2012 (TW) .............................. 101116600 A

(51) Int. Cl.
| | |
|---|---|
| *G02B 5/23* | (2006.01) |
| *G02B 1/04* | (2006.01) |
| *G02B 5/22* | (2006.01) |
| *G03C 1/00* | (2006.01) |
| *G03F 7/00* | (2006.01) |

(52) U.S. Cl.
CPC ....................................... *G02B 1/04* (2013.01)

(58) Field of Classification Search
USPC ............... 252/586; 359/891; 428/447; 430/7, 430/270.1, 280.1, 321; 522/6, 27, 48, 49, 522/59, 99
See application file for complete search history.

(56) References Cited

U.S. PATENT DOCUMENTS

| | | | | |
|---|---|---|---|---|
| 2008/0213514 | A1* | 9/2008 | Kim et al. | .................... 428/1.53 |
| 2008/0220372 | A1* | 9/2008 | Lee et al. | ................... 430/281.1 |
| 2011/0230584 | A1 | 9/2011 | Araki et al. | |
| 2012/0003436 | A1* | 1/2012 | Saie et al. | ................. 428/195.1 |
| 2013/0135763 | A1* | 5/2013 | Liao et al. | ..................... 359/891 |
| 2013/0228727 | A1* | 9/2013 | Liao et al. | ...................... 252/586 |
| 2013/0277627 | A1* | 10/2013 | Tseng et al. | .................. 252/586 |

FOREIGN PATENT DOCUMENTS

| | | | | |
|---|---|---|---|---|
| CN | 102227455 A | 10/2011 | | |
| JP | 1996-183819 | 7/1996 | | |
| JP | 1994-095211 | 4/1997 | | |
| JP | 2008-107529 | * | 5/2008 | ............. G03F 7/075 |
| JP | 2008-116493 | * | 5/2008 | ............. G03F 7/075 |
| JP | 2010-145437 | 7/2010 | | |
| JP | 2012-027480 | 2/2012 | | |
| JP | 2012027480 A | 2/2012 | | |
| TW | 2006-25002 A | 7/2006 | | |
| TW | 2012-11166 A1 | 3/2012 | | |

OTHER PUBLICATIONS

Office action issued on Mar. 11, 2014 to the corresponding Taiwan Patent Application No. 101116600.
English translation of cited references TW2006-25002A and TW2012-11166A1.

* cited by examiner

*Primary Examiner* — Bijan Ahvazi
(74) *Attorney, Agent, or Firm* — WPAT, P.C.; Anthony King; Kay Yang

(57) ABSTRACT

The invention relates to a photosensitive resin composition, and it has the advantages of a high development speed and good compatibility. The invention also provides a method for manufacturing a color filter, color filter and liquid crystal display device.

16 Claims, No Drawings

PHOTOSENSITIVE RESIN COMPOSITION FOR A COLOR FILTER AND USES THEREOF

BACKGROUND OF THE INVENTION

1. Field of the Invention

The invention relates to a photosensitive resin composition for a color filter of a liquid crystal display device; particularly, to a photosensitive resin composition for a color filter having a high development speed and good compatibility.

2. Description of the Related Art

Recently, a color filter has been applied widely in a color liquid crystal display device, color fax machine, color camera and other office equipments in the field. With the ever expanding market demand, the production technology of the color filter also tends to diversify. A dyeing method, a printing method, a plating method, and a dispersion method for the production have been developed, and wherein the dispersion method is a mainstream method.

In the dispersion method, a coloring pigment is first dispersed in a photosensitive resin, and then the photosensitive resin is coated on a glass substrate. After the steps of exposure and development, a specific pattern can be obtained. Such process is repeated three times, and a red (R), green (G) and blue (B) pattern of a colored pixel layer can be prepared thereby. Thereafter, a protective film is applied onto the pattern of the colored pixel layer as needed.

A photosensitive resin used in the dispersion method is as disclosed by Japanese Patent Publication Nos. 6-95211 and 8-183819. For example, a copolymer polymerized by (meth) acrylic acid monomer is applied as the photosensitive resin of an alkali-soluble resin.

However, the manufacturing process of the color filter comprises multiple heat treatment steps, such as a post-bake step after forming the red (R), green (G) and blue (B) pattern of the colored pixel layer, and a forming step of a transparent conductive film (ITO film). Such steps are generally operated at a high temperature of above 200° C. However, if the above mentioned conventional photosensitive resin is heated at 180° C. for about 1 hour, agglomerates of the pigment easily occur in the colored pixel layer (the particle sizes of the agglomerates of the pigment usually ranging from 1 to 10 μm), and the heat resistance of the colored pixel layer is also poor.

In order to resolve the above problems, Japanese Patent Publication No. 2010-145437 discloses a photosensitive resin composition comprising a polysiloxane as the alkali-soluble resin of the photosensitive resin. However, if using the polysiloxane as the alkali-soluble resin solely, the development property is not satisfactory.

In another aspect, Japanese Patent Publication No. 2012-027480 discloses a photosensitive resin composition, and a polysiloxane and an acrylic-based polymer are applied together to improve the adhesion between the photosensitive resin composition and the substrate, but the poor development property persists. Moreover, the poor compatibility between the resins is easily observed, and a satisfactory product is still absent.

Therefore, improving the development property and compatibility at the same time to meet the modern requirements is a target remained to be achieved in the technical field of the present invention.

SUMMARY OF THE INVENTION

In the present invention, the specific contents of an alkali-soluble resin and solvent is provided to obtain a photosensitive resin composition having a high development speed and good compatibility.

Therefore, the invention relates to a photosensitive resin composition comprising:
an alkali-soluble resin (A);
a compound having an ethylenically unsaturated group (B);
a photoinitiator (C);
an organic solvent (D); and
a pigment (E);
wherein the alkali-soluble resin (A) comprises a polysiloxane (A-1), and the polysiloxane (A-1) is obtained by hydrolyzing and condensing a silane compound represented by Formula (1);

  Formula (1)

wherein:
at least one of $R^a$ represents an alkyl group or alkoxyl group having an epoxy-substituted group or a carboxylic acid anhydride substituent; and the other $R^a$ is independently selected from the group consisting of a hydrogen atom, a $C_1$-$C_{10}$ alkyl group, a $C_2$-$C_{10}$ alkenyl group, and a $C_6$-$C_{15}$ aryl group;
$R^b$ is independently selected from the group consisting of a hydrogen atom, a $C_1$-$C_6$ alkyl group, a $C_1$-$C_6$ acyl group, and a $C_6$-$C_{15}$ aryl group; and
z represents an integer from 1 to 3; and
the organic solvent (D) comprises an organic solvent (D-1) having no hydroxyl group and having an ether bond and an ester bond and an organic solvent (D-2) having a hydroxyl group.

The present invention also provides a method for manufacturing a color filter comprising forming a pattern with the photosensitive resin composition as mentioned above.

The present invention also provides a color filter manufactured by the method as mentioned above.

The present invention further provides a liquid crystal display device comprising the color filter as mentioned above.

DETAILED DESCRIPTION OF THE INVENTION

The invention relates to a photosensitive resin composition comprising:
an alkali-soluble resin (A);
a compound having an ethylenically unsaturated group (B);
a photoinitiator (C);
an organic solvent (D); and
a pigment (E).

The alkali-soluble resin (A) according to the invention comprises a polysiloxane (A-1). There is no specific limitation to the structure of polysiloxane (A-1). In one preferred embodiment of the invention, the polysiloxane (A-1) is obtained by hydrolyzing and condensing a silane compound and/or a siloxane prepolymer; preferably, by partially condensing.

In one preferred embodiment of the invention, the silane compound includes but is not limited to a structure represented by Formula (1);

  Formula (1)

wherein:
at least one of $R^a$ represents an alkyl group or alkoxyl group having an epoxy-substituted group or a carboxylic acid anhydride substituent; and the other $R^a$ is independently selected from the group consisting of a hydrogen atom, a $C_1$-$C_{10}$ alkyl group, a $C_2$-$C_{10}$ alkenyl group, and a $C_6$-$C_{15}$ aryl group. The plural $R^a$s can be identical with or different from each other.

$R^b$ is independently selected from the group consisting of a hydrogen atom, a $C_1$-$C_6$ alkyl group, a $C_1$-$C_6$ acyl group, and a $C_6$-$C_{15}$ aryl group. The plural $R^b$s can be identical with or different from each other.

z represents an integer from 1 to 3.

In the compound represented by Formula (1), preferably, at least one of $R^a$ represents an alkyl group or alkoxyl group having an epoxy-substituted group or a succinic acid anhydride substituent. Examples of the alkyl group or alkoxyl group having an epoxy-substituted group or a carboxylic acid anhydride substituent are a methyl, ethyl, n-propyl, isopropyl, n-butyl, tert-butyl, n-hexyl, n-decyl, n-butoxyl-n-propyl, isopropoxymethyl, ethoxyethyl, or oxyalkyl. In another aspect, the alkyl group or alkoxyl group without an epoxy-substituted group or a carboxylic acid anhydride substituent, alkenyl group and aryl group of the other $R^a$ may be with or without a substituent depending on the feature needed. In one embodiment of the invention, in the alkyl group or alkoxyl group without an epoxy-substituted group or a carboxylic acid anhydride substituent of the other $R^a$, the $C_1$-$C_{10}$ alkyl group is methyl, ethyl, n-propyl, isopropyl, n-butyl, tert-butyl, n-hexyl, n-decyl, trifluoromethyl, 2,2,2-trifluoroethyl, 3,3,3-trifluoropropyl, 3-aminopropyl, 3-mercaptopropyl, or 3-isocyanatopropyl; the $C_2$-$C_{10}$ alkenyl group is vinyl, 3-acryloxypropyl or 3-methacryloxypropyl; and the $C_6$-$C_{15}$ aryl group is phenyl, tolyl, p-hydroxyphenyl, 1-(p-hydroxyphenyl)ethyl, 2-(p-hydroxyphenyl)ethyl, 4-hydroxy-5-(p-hydroxyphenylcarbonyloxy)pentyl, or naphthyl.

In the compound represented by Formula (1), $R^b$ is independently selected from the group consisting of a hydrogen atom, a $C_1$-$C_6$ alkyl group, a $C_1$-$C_6$ acyl group, and a $C_6$-$C_{15}$ aryl group. The plural $R^b$s can be identical with or different from each other. The alkyl group, acyl group and aryl group may be with or without a substituent depending on the feature needed. In one embodiment of the invention, in $R^b$, the $C_1$-$C_6$ alkyl group is methyl, ethyl, n-propyl, isopropyl, or n-butyl; the $C_1$-$C_6$ acyl group is acetyl; and the $C_6$-$C_{15}$ aryl group is phenyl.

In the compound represented by Formula (1), z represents an integer from 1 to 3. When z denotes 1, the silane compound represents a trifunctional silane; when z denotes 2, the silane compound represents a difunctional silane; when z denotes 3, the silane compound represents a monofunctional silane.

In one preferred embodiment of the invention, the silane compound having an epoxy-substituted group or a succinic acid anhydride substituent represented by Formula (1) includes but is not limited to (i) trifunctional silane; 3-ethyl-3-(3-triethoxysilyl propoxymethyl) oxetane, 3-ethyl-3-(3-trimethoxysilyl propoxymethyl) oxetane, 3-ethyl-3-(3-triphenoxyphenylsilyl tripropoxymethyl) oxetane, 3-trimethoxysilyl propyl succinic anhydride, 3-triethoxysilyl propyl succinic anhydride, 3-triphenoxyphenylsilyl propyl succinic anhydride, 2-(ethyl trimethoxy silyl) succinic anhydride, 3-(propyl triphenoxy silyl) succinic anhydride, commercially available 3-(trimethoxysilyl)propyl succinic anhydride manufactured by Shin-Etsu (trade name: X-12-967), commercially available 3-(triethoxysilyl)propyl succinic anhydride manufactured by WACKER (trade name: GF-20), 3-trimethoxysilylpropyl glutaric anhydride (TMSG), 3-triethoxysilylpropyl glutaric anhydride, and 3-triphenoxysilyl-propyl glutaric anhydride; (ii) difunctional silane: diisopropoxy bis(2-oxetanyl butoxy propyl) silane, dimethyl bis(3-oxetanyl pentyl) silane, di-n-butoxysilyl propyl succinic anhydride, dimethoxysilyl diethylsuccinic anhydride, di-n-butoxysilyl bis(propyl succinic anhydride), and di-methoxysilyl bis(ethyl succinic anhydride); (iii) monofunctional silane: ethoxy-bis(2-oxetanyl butoxyl ethyl)-2-pentyl silyl oxetane, phenoxy tripropyl silyl succinic anhydride, diethylmethoxy methyl silyl succinic anhydride, tris(phenoxy silyl) propyl succinic anhydride, and bis(methyl methoxy silyl) ethyl succinic anhydride. The aforesaid examples of the silane compound can be used alone or as a mixture of two or more.

When copolymerizing the compound represented by Formula (1), it is necessary to carry on a ring-opening reaction of an alkylene oxide group or carboxyl anhydride group to form a diol group or carboxyl acid group, such as to carry on a ring-opening reaction of a succinic anhydride group to form a succinic acid group. The diol group of high hydrophilicity formed by ring-opening the epoxy-substituted group and the succinic acid group of high hydrophilicity formed by ring-opening the succinic anhydride group are effective on improving the solubility of the alkali-soluble resin and the development. In one preferred embodiment of the invention, the sufficient condition to completely ring-open the epoxy-substituted group or carboxyl anhydride group for polymerization is at the temperature of more than 100° C. for 30 minutes.

In one another preferred embodiment of the invention, the silane compound includes but is not limited to a structure represented by Formula (2);

$$Si(R^i)_y(OR^j)_{4-y} \qquad \text{Formula (2)}$$

wherein:

$R^i$ is independently selected from the group consisting of a hydrogen atom, a $C_1$-$C_{10}$ alkyl group, a $C_2$-$C_{10}$ alkenyl group, and a $C_6$-$C_{15}$ aryl group. The $C_1$-$C_{10}$ alkyl group is without a carboxylic acid anhydride. The plural $R^i$s can be identical with or different from each other.

$R^j$ is independently selected from the group consisting of a hydrogen atom, a $C_1$-$C_6$ alkyl group, a $C_1$-$C_6$ acyl group, and a $C_6$-$C_{15}$ aryl group. The plural $R^j$s can be identical with or different from each other.

y represents an integer from 0 to 3.

The silane compound without a carboxylic acid anhydride substituent represented by Formula (2) includes but is not limited to (i) tetrafunctional silane: tetramethoxysilane, tetraethoxysilane, tetraacetoxysilane, and tetraphenoxy silane; (ii) trifunctional silane: methyltrimethoxysilane (MTMS), methyltriethoxysilane, methyltriisopropoxysilane, methyltri-n-butoxysilane, ethyltrimethoxysilane, ethyltriethoxysilane, ethyltriisopropoxysilane, ethyltri-n-butoxysilane, n-propyltrimethoxysilane, n-propyltriethoxysilane, n-butyltrimethoxysilane, n-butyltriethoxysilane, n-hexyltrimethoxysilane, n-hexyltriethoxysilane, decyltrimethoxysilane, vinyltrimethoxysilane, vinyltriethoxysilane, 3-acryloyloxypropyltrimethoxysilane, 3-acryloyloxypropyltriethoxysilane, 3-methylacryloyloxypropyltrimethoxysilane, 3-methylacryloyloxypropyltriethoxysilane, phenyltrimethoxysilane (PTMS), phenyltriethoxysilane (PTES), p-hydroxyphenyltrimethoxysilane, 1-(p-hydroxyphenyl)ethyltrimethoxysilane, 2-(p-hydroxyphenyl)ethyltrimethoxysilane, 4-hydroxy-5-(p-hydroxyphenylcarbonyloxy)pentyltrimethoxysilane, trifluoromethyltrimethoxysilane, trifluoromethyltriethoxysilane, 3,3,3-trifluoropropyltrimethoxysilane, 3-aminopropyltrimethoxysilane, 3-aminopropyltriethoxysilane, 3-glycidoxypropyltrimethoxysilane, 3-glycidoxypropyltriethoxysilane, 2-(3,4-epoxycyclohexyl) ethyltrimethoxysilane, 3-mercaptopropyltrimethoxysilane, 2-oxetanylbutoxypropyltriphenoxysilane, commercially available 2-oxetanylbutoxypropyltrimethoxysilane manufactured by Toagosei (trade name. TMSOX), and commercially available 2-oxetanylbutoxypropyltriethoxysilane manufactured by Toagosei (trade name. TESOX); (iii) difunctional silane: dimethyldimethoxysilane (DMDMS), dimethyldiethoxysilane, dimethyldiacetyloxysilane, di-n-butyldimethoxysilane, diphenyldimethoxysilane, diisopropoxy-di(2-oxetanylbutoxypropyl)silane (DIDOS), and di(3-oxetanylpentyl)dimethoxysilane; and (iv) monofunctional silane: trimethylmethoxysilane, tri-n-butylethoxysilane, 3-glycidoxydimethylmethoxysilane, 3-glycidoxydimethylethoxysilane, di(2-oxetanylbutoxypentyl)-2-oxetanylpentylethoxysilane, and tri(2-oxetanylpentyl)methoxysilane. The aforesaid examples of the silane compound can be used alone or as a mixture of two or more.

According to the invention, when the carboxylic acid anhydride carried out a ring breakage reaction, the molar ratio of the broken ring to the polysiloxane (A-1) in Si atom is not limited; and preference is more than 10 mol %. When the content of the carboxylic acid group is less than 10 mol %, the hydrophilicity of the polysiloxane (A-1) is not sufficient. Therefore, when the pattern coated thereby is subjected to the basic development solution, the sensitivity and development is not satisfactory. The method for assaying the content of the carboxylic acid group includes but is not limited to the process described below.

First, the polysiloxane (A-1) is mixed with 1% by weight of benzene as a standard, and subjected to an elementary analysis and $^1$H-NMR assay. The molar ratio of the benzene to the Si atom is calculated in the elementary analysis. The peak area of the carboxylic acid (the solvent used: $CDCl_3$ in $^1$H-NMR) and that of the benzene is calculated in the $^1$H-NMR assay. The molar ratio of the broken ring of the carboxylic acid anhydride to the polysiloxane (A-1) in Si atom is calculated based on the molar number of the benzene.

In one another preferred embodiment of the invention, the siloxane prepolymer includes but is not limited to a structure represented by Formula (3);

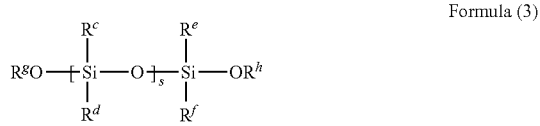

Formula (3)

wherein:
$R^c$, $R^d$, $R^e$, and $R^f$ represent, respectively and independently, a hydrogen atom, a $C_1$-$C_{10}$ alkyl group, a $C_2$-$C_6$ alkenyl group, or a $C_6$-$C_{15}$ aryl group; wherein the alkyl group, alkenyl group or aryl group preferably contains a substituent;

s represents an integer ranging from 1 to 1,000; preferably from 3 to 300; and more preferably from 5 to 200.

When s represents an integer from 2 to 1,000, the plural $R^c$s and $R^d$s can be respectively identical with or different from each other. Examples of the alkyl group include, but are not limited to, methyl, ethyl, n-propyl, or the like. Examples of the alkenyl group include, but are not limited to, vinyl, acryloxypropyl, methacryloxypropyl, or the like. Examples of the aryl group include, but are not limited to, phenyl, tolyl, naphthyl, or the like.

$R^g$ and $R^h$ represent, respectively and independently, a hydrogen atom, a $C_1$-$C_6$ alkyl group, a $C_1$-$C_6$ acyl group, or a $C_6$-$C_{15}$ aryl group; wherein the alkyl group, acyl group or aryl group preferably contains a substituent. Examples of the alkyl group include, but are not limited to, methyl, ethyl, n-propyl, isopropyl, n-butyl, or the like. Examples of the acyl group include, but are not limited to, acetyl, or the like. Examples of the aryl group include, but are not limited to, phenyl, or the like.

Examples of the siloxane prepolymer include, but are not limited to, 1,1,3,3-tetramethyl-1,3-dimethoxydisiloxane, 1,1,3,3-tetramethyl-1,3-diethoxydisiloxane, 1,1,3,3-tetraethyl-1,3-diethoxydisiloxane, commercially available silanol terminal siloxane prepolymers manufactured by Gelest Inc. for example, DM-S12 (molecular weight: 400-700), DMS-S15 (molecular weight: 1,500-2,000), DMS-S21 (molecular weight: 4,200), DMS-S27 (molecular weight: 18,000), DMS-S31 (molecular weight:26,000), DMS-S32 (molecular weight: 36,000), DMS-S33 (molecular weight: 43,500), DMS-S35 (molecular weight: 49,000), DMS-S38 (molecular weight: 58,000), DMS-S42 (molecular weight: 77,000), PDS-9931 (molecular weight: 1,000-1,400), or the like. The aforesaid examples of the siloxane prepolymer can be used alone or as a mixture of two or more.

When the silane compound and the siloxane prepolymer are used in combination, there is no specific limitation to the mixing ratio thereof. Preferably, the molar ratio of the silane compound and the siloxane prepolymer in Si atom ranges from 100:0.01 to 50:50.

In one another preferred embodiment of the invention, besides of obtained by hydrolyzing and condensing a silane compound and/or a siloxane prepolymer, the polysiloxane can also be prepared via a copolymerization by mixing the silane compound and/or siloxane prepolymer with silicon dioxide particles. There is no specific limitation to the mean particle size of the silicon dioxide particles. The mean particle size of the silicon dioxide particles ranges generally from 2 nm to 250 nm, preferably from 5 nm to 200 nm, and more preferably from 10 nm to 100 nm.

Examples of the silicon dioxide particles include commercially available products manufactured by Catalysts and Chemicals Ltd., for example, OSCAR 1132 (particle size: 12 nm, dispersant: methanol), OSCAR 1332 (particle size: 12 nm, dispersant: n-propanol), OSCAR 105 (particle size: 60 nm, dispersant: γ-butyrolactone), OSCAR 106 (particle size: 120 nm, dispersant: diacetone alcohol), or the like; commercially available products manufactured by Fuso Chemical Co., Ltd., for example, Quartron PL-1-IPA (particle size: 13 nm, dispersant: isopropanone), Quartron PL-1-TOL (particle size: 13 nm, dispersant: toluene), Quartron PL-2L-PGME (particle size: 18 nm, dispersant: propylene glycol monomethyl ether), Quartron PL-2L-MEK (particle size: 18 nm, dispersant: methyl ethyl ketone), or the like; commercially available products manufactured Nissan Chemical, for example, IPA-ST (particle size: 12 nm, dispersant: isopropanol), EG-ST (particle size: 12 nm, dispersant: ethylene glycol), IPA-ST-L (particle size: 45 nm, dispersant: isopropanol), IPA-ST-ZL (particle size: 100 nm, dispersant: isopropanol), or the like. The aforesaid silicon dioxide particles can be used alone or as a mixture of two or more.

There is no specific limitation to the amounts when mixing the silicon dioxide particles with the silane compound and/or the siloxane prepolymer. Preferably, the molar ratio of the silicon dioxide particles to the polysiloxane (A-1) in Si atom ranges from 1% to 50%.

The synthesis of the polysiloxane (A-1) according to the invention includes but is not limited to hydrolyzing and condensing a silane compound and/or a siloxane prepolymer, and silicon dioxide particles; preferably hydrolyzing and condensing the silane compound represented by Formula (1) or (2). Preferably, a solvent, such as water, and optionally a catalyst are added to the reaction mixture, followed by stiffing at a high temperature. During stirring, the by-products of hydrolysis such as alcohols (e.g. methanol) and the by-products of condensation such as water, can be removed by distillation if necessary.

There is no specific limitation to the solvent of synthesizing the polysiloxane (A-1), which can be identical with the organic solvent (D) as mentioned below. The solvent is used in an amount ranging generally from 10 wt % to 1000 wt %, preferably 100 wt %, based on 100 wt % of the total organic silane. When water is applied as the solvent, the amount of water for the hydrolysis ranges from 0.5 to 2 moles based on 1 mole of the hydrolysable groups contained in the mixture.

There is no specific limitation to the catalyst optionally added in the synthesis of the polysiloxane (A-1), and an acid catalyst or a base catalyst can be preferably used. Examples of the acid catalyst include hydrochloric acid, nitric acid, sulfuric acid, hydrofluoric acid, oxalic acid, phosphoric acid, acetic acid, trifluoroacetic acid, formic acid, polycarboxylic acids and anhydrides thereof. Examples of the base catalyst include diethylamine, triethylamine, tripropylamine, tributylamine, tripentylamine, trihexylamine, triheptylamine, trioctylamine, diethanolamine, triethanolamine, sodium hydroxide, potassium hydroxide hydrate, and compounds containing an amino group. Preferably, the catalyst is used in an amount ranging generally from 0.01 wt % to 1 wt %, based on 100 wt % of the total organic silane.

In view of the coatability and storage stability, it is preferable that the by-products (for example, alcohols or water) and the catalyst are not contained in polysiloxane (A-1) produced after hydrolysis and condensation for improving the coating property and stability of storage. Therefore, purification is carried out if necessary. There is no specific limitation to the purification method. Preferably, the polysiloxane (A-1) is diluted with a hydrophobic solvent, and the organic layer washed with water several times is then concentrated with an evaporator to remove alcohols and water. Additionally, the catalyst can be removed using ion exchange resin or using the wash with water as mentioned above.

One of the technical features of the invention is using a polyxiloxane (A-1) containing an oxetanyl or a carboxylic acid anhydride substituent, and the rate of the photosensitivity is enhanced dramatically. To the contrary, the development speed is not satisfactory if the polysiloxane (A-1) containing an oxetanyl or a carboxylic acid anhydride substituent is absent.

According to the invention, the amount of the polysiloxane (A-1) used is preferably from 5 to 70 parts by weight based on 100 parts by weight of the alkali-soluble resin (A) used; more preferably from 8 to 65 parts by weight; still more preferably from 10 to 60 parts by weight. The development speed of the filter produced thereby is enhanced dramatically when applying the photosensitive resin composition.

In one preferred embodiment of the invention, the alkali-soluble resin (A) further comprises an acrylic resin (A-2). In one preferred embodiment of the invention, the acrylic resin (A-2) is obtained by copolymerizing an ethylenically unsaturated monomer having one or more carboxyl groups and another copolymerizable ethylenically unsaturated monomer.

Examples of the aforementioned ethylenically unsaturated monomer having one or more carboxyl groups include, but are not limited to, unsaturated monocarboxylic acids, such as acrylic acid (abbreviated as AA), methacrylic acid, butenoic acid, α-chloroacrylic acid, ethacrylic acid, cinnamic acid, 2-acryloylethoxy succinate, 2-methacryloylethoxy succinate (abbreviated as HOMS), 2-isobutyrylethoxy succinate, or the like; unsaturated dicarboxylic acids and/or anhydrides thereof, such as maleic acid, maleic anhydride, fumaric acid, itaconic acid, itaconic anhydride, citraconic acid, citraconic anhydride, or the like; and unsaturated polycarboxylic acids having at least three carboxyl groups in the molecules and/or anhydrides thereof; or the like. Preferably, the ethylenically unsaturated monomer having one or more carboxyl groups is selected from acrylic acid, methacrylic acid, 2-acryloylethoxy succinate, 2-methacryloylethoxy succinate and 2-isobutyrylethoxy succinate. The ethylenically unsaturated monomer having one or more carboxyl groups can be used alone or as a mixture of two or more for increasing the pigment dispersion, enhancing the development speed, and reducing the residue.

Examples of the another copolymerizable ethylenically unsaturated monomer include, but are not limited to, vinyl aromatic compounds, such as styrene (abbreviated as SM), α-methyl styrene, o-vinyl toluene, p-chlorostyrene, methoxystyrene, or the like; maleimides, such as N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide, N-p-methoxyphenylmaleimide, N-cyclohexylmaleimide, or the like; unsaturated carboxylates, such as methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, iso-butyl acrylate, iso-butyl methacrylate, sec-butyl acrylate, sec-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate (abbreviated as BzMA), phenyl acrylate, phenyl methacrylate, methoxy triethylene glycol acrylate, methoxy triethylene glycol methacrylate, lauryl methacrylate, tetradecyl methacrylate, cetyl methacrylate, octadecyl methacrylate, eicosyl methacrylate, docosyl methacrylate, dicyclopentenyloxyethyl acrylate (abbreviated as DCPOA), or the like; unsaturated amino alkyl carboxylates, such as N,N-dimethyl aminoethyl acrylate, N,N-dimethyl aminoethyl methacrylate, N,N-diethyl aminopropyl acrylate, N,N-dimethyl aminopropyl methacrylate, N,N-dibutyl aminopropyl acrylate, N-isobutyl aminopropyl acrylate, or the like; unsaturated glycidyl carboxylates, such as glycidyl acrylate, glycidyl methacrylate (abbreviated as GMA), or the like; vinyl carboxylates, such as vinyl acetate, vinyl propionate, vinyl butyrate, or the like; unsaturated ethers, such as vinyl methyl ether, vinyl ethyl ether, allyl glycidyl ether, methallyl glycidyl ether, or the like; vinyl cyanides, such as acrylonitrile, methyl acrylonitrile, α-chloroacrylonitrile, vinylidene cyanide, or the like; unsaturated amides, such as acrylamide, methacrylamide, α-chloroacrylamide, N-hydroxyethyl acrylamide, N-hydroxyethyl methacrylamide, or the like; and aliphatic conjugate dienes, such as 1,3-butadiene, iso-propylene, chloroprene, or the like.

Preferably, the another copolymerizable ethylenically unsaturated monomer is selected from styrene, N-phenylmaleimide, methyl acrylate, methyl methacrylate, 2-hydroxyethyl acrylate, 2-hydroxyethyl methacrylate, benzyl acrylate, benzyl methacrylate, and dicyclopentenyloxyethyl acrylate. The aforesaid examples of the ethylenically unsaturated monomer can be used alone or in admixture of two or more thereof.

Preferably, 50 to 95 parts by weight of the ethylenically unsaturated monomer having one or more carboxyl groups and 5 to 50 parts by weight of the another copolymerizable ethylenically unsaturated monomer used in the copolymerization reaction based on 100 parts by weight of the sum of the ethylenically unsaturated monomer having one or more carboxyl groups and the another copolymerizable ethylenically unsaturated monomer.

In another aspect, examples of the solvent suitable for preparing the acrylic resin (A-2) include, but are not limited to, (poly)alkylene glycol monoalkyl ethers, such as ethylene glycol methyl ether (abbreviated as EGMME), ethylene glycol ethyl ether, diethylene glycol methyl ether, diethylene glycol ethyl ether, diethylene glycol n-propyl ether, diethylene glycol n-butyl ether, triethylene glycol methyl ether, triethylene glycol ethyl ether, propylene glycol methyl ether, propylene glycol ethyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, or the like; (poly)alkylene glycol monoalkyl ether acetates, such as ethylene glycol methyl ether acetate, ethylene glycol ethyl ether acetate, propylene glycol methyl ether acetate, propylene glycol ethyl ether acetate, or the like; other ethers, such as diethylene glycol dimethyl ether, diethylene glycol methyl ethyl ether, diethylene glycol diethyl ether, tetrahydrofuran, or the like; ketones, such as methyl ethyl ketone, cyclohexanone, 2-heptanone, 3-heptanone, or the like; alkyl lactate, such as methyl 2-hydroxypropionate, ethyl 2-hydroxypropionate, or the like; other esters, such as methyl 2-hydroxy-2-methylpropionate, ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxy acetate, ethyl hydroxy acetate, methyl 2-hydroxy-3-methylbutyrate, 3-methyl-3-methoxybutyl acetate, 3-methyl-3-methoxybutyl propionate, ethyl acetate, n-propyl acetate, iso-propyl acetate, n-butyl acetate, iso-butyl acetate, n-amyl acetate, iso-amyl acetate, n-butyl propionate, ethyl butyrate, n-propyl butyrate, iso-propyl butyrate, n-butyl butyrate, methyl pyruvate, ethyl pyruvate, n-propyl pyruvate, methyl acetoacetate, ethyl acetoacetate, ethyl 2-oxobutyrate, or the like; aromatic hydrocarbons, such as toluene, xylene, or the like; and carboxylic acid amide, such as N-methyl-2-pyrrolidone, N,N-dimethylformamide, N,N-dimethylacetamide, or the like. Preferably, the solvent is selected from propylene glycol methyl ether acetate and ethyl 3-ethoxypropionate. The aforesaid examples of the solvent can be used alone or in admixture of two or more thereof.

Furthermore, the initiator used for preparing the acrylic resin (A-2) is a free radical polymerization initiator, examples of which include, but are not limited to, azo compounds, such as 2,2'-azobisisobutyronitrile, 2,2'-azobis-(2,4-dimethylvaleronitrile), 2,2'-azobis-(4-methoxy-2,4-dimethylvaleronitrile), 2,2'-azobis-2-methyl butyronitrile, or the like; and peroxides, such as benzoyl peroxide, or the like.

Preferably, the amount of the acrylic resin (A-2) used is from 30 to 95 parts by weight based on 100 parts by weight of the alkali-soluble resin (A) used; more preferably from 35 to 90 parts; still more preferably from 40 to 85 parts. The development of the filter produced thereby is enhanced dramatically when applying the photosensitive resin composition.

The compound having an ethylenically unsaturated group (B) according to the present invention comprises but is not limited to a first compound (B-1), a second compound (B-2), or a combination thereof.

The first compound (B-1) according to the invention is a (meth)acrylate compound obtained by reacting a caprolactone-modified polyol with a (meth)acrylic acid. The caprolactone-modified polyol is obtained by reacting a caprolactone with a polyol having more than 4 functional groups. The caprolactone may be γ-caprolactone, δ-caprolactone or ε-caprolactone, and wherein preferably is ε-caprolactone. The aforesaid polyol having more than 4 functional groups may be pentaerythritol, ditrimethylolpropane, dipentaerythritol and the like. The amount of the caprolactone is preferably 1 to 12 mol based on the 1 mole of the polyol having more than 4 functional groups.

Examples of the first compound (B-1) are pentaerythritol caprolactone-modified tetra(meth)acrylate, ditrimethylolpropane caprolactone-modified tetra(meth)acrylate, and dipentaerythritol caprolactone-modified poly(meth)acrylate; wherein the structure of dipentaerythritol caprolactone-modified poly(meth)acrylate is represented by Formula (4)

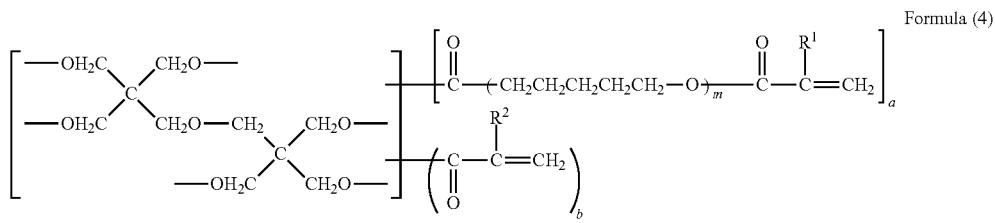

Formula (4)

In the structure of Formula (4), $R^1$ and $R^2$ each represents hydrogen or methyl; m is an integer of from 1 to 2; a is an integer of 1 to 6; b is an integer of 0 to 5; wherein a+b=2 to 6; preferably a+b=3 to 6; more preferably a+b=5 to 6, and most preferably a+b=6.

The aforesaid dipentaerythritol caprolactone-modified poly(meth)acrylate may be dipentaerythritol caprolactone-modified di(meth)acrylate, dipentaerythritol caprolactone-modified tri(meth)acrylate, dipentaerythritol caprolactone-modified tetra(meth)acrylate, dipentaerythritol caprolactone-modified penta(meth)acrylate, and dipentaerythritol caprolactone-modified hexa(meth)acrylate; and preferably is dipentaerythritol caprolactone-modified hexa(meth)acrylate. More particularly, the first compound (B-1) is KAYARAD® DPCA-20, DPCA-30, DPCA-60, DPCA-120 manufactured by Nippon Kayaku Co., Ltd.

The second compound (B-2) comprises a functional group represented by Formula (5),

Formula (5)

In the structure of Formula (5), $R^3$ represents hydrogen or methyl.

Examples of the second compound (B-2) are acrylamide, (meth) acryloylmorpholine, 7-amino-3,7-dimethyloctyl (meth)acrylate, iso-butoxymethyl (meth)acrylamide, iso-bornyloxyethyl (meth)acrylate, iso-bornyl (meth)acrylate, 2-ethylhexyl (meth)acrylate, ethyl diethylene glycol (meth) acrylate, t-octyl (meth)acrylamide, diacetone (meth)acrylamide, dimethylaminoethyl (meth)acrylate, dodecyl (meth)acrylate, dicyclopentenyloxyethyl (meth)acrylate (abbreviated as FA-512A), dicyclopentenyl (meth)acrylate, N,N-dimethyl (meth)acrylamide, tetrachlorophenyl (meth)acrylate, 2-tetrachlorophenoxy ethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate, ethylene glycol di(meth)acrylate, dicyclopentenyl di(meth)acrylate, triethylene glycol diacrylate, tetraethylene glycol di(meth)acrylate, tri(2-hydroxyethyl) isocyanate di(meth)acrylate, tri(2-hydroxyethyl) isocyanate tri(meth)acrylate, caprolactone-modified tri(2-hydroxyethyl) isocyanate tri(meth)acrylate, trimethylolpropyl tri(meth)acrylate, ethylene oxide (hereinafter abbreviated as EO) modified trimethylolpropyl tri(meth)acrylate, propylene oxide (hereinafter abbreviated as PO) modified trimethylolpropyl tri(meth)acrylate, tripropylene glycol di(meth)acrylate, neo-pentyl glycol di(meth)acrylate, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritol penta(meth)acrylate, dipentaerythritol tetra(meth)acrylate (abbreviated as DPTMA), caprolactone-modified dipentaerythritol hexa(meth)acrylate, caprolactone-modified dipentaerythritol penta(meth)acrylate, ditrimethylolpropyl tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, phenol novolac polyglycidyl ether (meth)acrylate, or the like.

Preferably, the second compound (B-2) is selected from trimethylolpropyl triacrylate, EO-modified trimethylolpropyl triacrylate, PO-modified trimethylolpropyl triacrylate, pentaerythritol triacrylate, pentaerythritol tetracrylate, dipentaerythritol hexaacrylate, dipentaerythritol pentaacrylate, dipentaerythritol tetraacrylate, caprolactone-modified dipentaerythritol hexaacrylate, ditrimethylolpropyl tetraacrylate, and PO-modified glycerol triacrylate. The aforesaid examples of the compound having an ethylenic group can be used alone or in admixture of two or more thereof.

Preferably, the amount of the compound having an ethylenically unsaturated group (B) used is from 10 to 500 parts by weight based on 100 parts by weight of the alkali-soluble resin (A) used; more preferably, the amount of the compound having an ethylenically unsaturated group (B) used is from 20 to 450 parts by weight based on 100 parts by weight of the alkali-soluble resin (A) used; still more preferably, the amount of the compound having an ethylenically unsaturated group (B) used is from 30 to 400 parts by weight based on 100 parts by weight of the alkali-soluble resin (A) used.

The photoinitiator (C) suitable for the present invention can be chosen by skilled artisans in this field, such as O-acyloxime compounds, triazine compounds, acetophenone compounds, biimidazole compounds, or benzophenone compounds.

Preferably, the amount of the photoinitiator (C) used is from 2 to 200 parts by weight based on 100 parts by weight of the alkali-soluble resin (A) used; more preferably the amount of the photoinitiator (C) used is from 5 to 180 parts by weight; still more preferably, the photoinitiator (C) used is from 10 to 150 parts by weight.

Examples of the O-acyloxime compounds include, but are not limited to, 1-[4-(phenylthio)phenyl]-heptane-1,2-dione 2-(O-benzoyloxime), 1-[4-(phenylthio)phenyl]-octane-1,2-dione 2-(O-benzoyloxime) (such as OXE 01 manufactured by Ciba Specialty Chemicals), 1-[4-(benzoyl)phenyl]-heptane-1,2-dione 2-(O-benzoyloxime), 1-[9-ethyl-6-(2-methylbenzoyl)-9H-carbazol-3-yl]-ethylketo 1-(O-acetyloxime) (such as OXE 02 manufactured by Ciba Specialty Chemicals), 1-[9-ethyl-6-(3-methylbenzoyl)-9H-carbazol-3-yl]-ethylketo 1-(O-acetyloxime), 1-[9-ethyl-6-benzoyl-9H-carbazol-3-yl]-ethylketo 1-(O-acetyloxime), ethylketo-1-[9-ethyl-6-(2-methyl-4-tetrahydrofurylbenzoyl)-9H-carbazol-3-yl]-1-(O-acetyloxime), ethylketo-1-[9-ethyl-6-(2-methyl-4-tetrapyranylbenzoyl)-9H-carbazol-3-yl]-1-(O-acetyloxime), ethylketo-1-[9-ethyl-6-(2-methyl-5-tetrafurylbenzoyl)-9H-carbazol-3-yl]-1-(O-acetyloxime), ethylketo-1-[9-ethyl-6-(2-methyl-5-tetrapyranylbenzoyl)-9H-carbazol-3-yl]-1-(O-acetyloxime), ethylketo-1-[9-ethyl-6-(2-methyl-4-tetrafurylmethoxybenzoyl)-9H-carbazol-3-yl]-1-(O-acetyloxime), ethylketo-1-[9-ethyl-6-(2-methyl-4-tetrapyranylmethoxybenzoyl)-9H-carbazol-3-yl]-1-(O-acetyloxime), ethylketo-1-[9-ethyl-6-(2-methyl-5-tetrafurylmethoxybenzoyl)-9H-carbazol-3-yl]-1-(O-acetyloxime), ethylketo-1-[9-ethyl-6-(2-methyl-5-tetrapyranylmethoxybenzoyl)-9H-carbazol-3-yl]-1-(O-acetyloxime), ethylketo-1-[9-ethyl-6-{2-methyl-4-(2,2-dimethyl-1,3-dioxolyl)benzoyl}-9H-carbazol-3-yl]-1-(O-acetyloxime), ethylketo-1-[9-ethyl-6-{2-methyl-4-(2,2-dimethyl-1,3-dioxolyl)methoxybenzoyl}-9H-carbazol-3-yl]-1-(O-acetyloxime), ethylketo-1-[9-ethyl-6-(2-cholro-4-benzyl-thio-benzoyl)-9H-carbazole-3-yl]-, 1-(O-acetyl oxime) (manufactured by Asahi Denka), or the like; preferably, 1-[9-ethyl-6-(2-methylbenzoyl)-9H-carbazol-3-yl]-ethylketo 1-(O-acetyloxime) or 1-[4-(phenylthio)phenyl]-octane-1,2-dione 2-(O-benzoyloxime).

Examples of the triazine compounds include, but are not limited to, 2,4-bis(trichloromethyl)-6-(p-methoxy)styryl-s-triazine, 2,4-bis(trichloromethyl)-6-(1-p-dimethylaminophenyl-1,3-butadienyl)-s-triazine, 2-trichloromethyl-4-amino-6-(p-methoxy)styryl-s-triazine, or the like; preferably, 2,4-bis(trichloromethyl)-6-(p-methoxy)styryl-s-triazine.

Examples of the acetophenone compounds include, but are not limited to, p-dimethylaminoacetophenone, α,α'-dimethoxyazoxyacetophenone, 2,2'-dimethyl-2-phenylacetophenone, p-methoxyacetophenone, 2-methyl-1-(4-methylthiophenyl)-2-morpholino-1-propanone, 2-benzyl-2-N,N-dimethylamino-1-(4-morpholinophenyl)-1-butanone, or the like; preferably, 2-methyl-1-(4-methylthiophenyl)-2-morpholino-1-propanone, 2-benzyl-2-N,N-dimethylamino-1-(4-morpholinophenyl)-1-butanone, or a combination thereof.

Examples of the biimidazole compounds include, but are not limited to, 2,2'-bis(o-chlorophenyl)-4,4',5,5'-tetraphenylbiimidazole, 2,2'-bis(o-fluorophenyl)-4,4',5,5'-tetraphenylbiimidazole, 2,2'-bis(o-methylphenyl)-4,4',5,5'-tetraphenylbiimidazole, 2,2'-bis(o-methoxyphenyl)-4,4',5,5'-tetraphenylbiimidazole, 2,2'-bis(o-ethylphenyl)-4,4',5,5'- tetraphenylbiimidazole, 2,2'-bis(p-methoxyphenyl)-4,4',5,5'-tetraphenylbiimidazole, 2,2'-bis(2,2',4,4'-tetramethoxyphenyl)-4,4',5,5'-tetraphenylbiimidazole, 2,2'-bis(2-chlorophenyl)-4,4',5,5'-tetraphenylbiimidazole, 2,2'-bis(2,4-dichlorophenyl)-4,4',5,5'-tetraphenylbiimidazole, or the like; preferably, 2,2'-bis(2,4-dichlorophenyl)-4,4',5,5'-tetraphenylbiimidazole.

Examples of the benzophenone compounds include, but are not limited to, thioxanthone, 2,4-diethylthioxanthone, thioxanthone-4-sulfone, benzophenone, 4,4'-bis(dimethylamino)benzophenone, 4,4'-bis(diethylamino)benzophenone (abbreviated as EABF), benzophenone hydrazone, 2-chlorobenzophenone, 4-chlorobenzophenone, 4,4'-Dichlorobenzophenone), or the like; preferably, 4,4'-bis(dimethylamino) benzophenone, 4,4'-bis(diethylamino)benzophenone, or a combination thereof.

In addition to the aforesaid photoinitiators, other initiators can be further added into the photosensitive resin composition of the present invention. Examples of the other initiators include, but are not limited to, α-diketone compounds, acyloin compounds, acyloin ether compounds, acylphosphine oxide compounds, quinone compounds, halide compounds, and peroxide compounds.

Examples of α-diketone compounds are benzil, acetyl, or the like; examples of acyloin compounds are benzoin, or the like; examples of acyloin ether compounds are benzoin methyl ether, benzoin ethyl ether, benzoin isopropyl ether, or the like; examples of acylphosphine oxide compounds are 2,4,6-trimethylbenzoyl diphenylphosphine oxide, bis-(2,6-dimethoxybenzoyl)-2,4,4-trimethyl benzyl phosphine oxide, or the like; examples of quinone compounds are anthraquinone, 1,4-naphthoquinone, or the like; examples of halide compounds are phenacyl chloride, tribromomethyl phenylsulfone, tris(trichloromethyl)-s-triazine, or the like; and examples of peroxide compounds are di-tert-butyl peroxide; or the like. The aforesaid examples of the photoinitiator (C) can be used alone or as a mixture of two or more.

The organic solvent (D) according to the invention can be chosen by skilled artisans in this field. Any solvents, which are inert to and can disperse or dissolve the alkali-soluble resin (A), the compound having an ethylenically unsaturated group (B) and the photoinitiator (C) and which have appropriate volatility, can be used. The organic solvent (D) according to the invention comprises an organic solvent (D-1) having no hydroxyl group and having an ether bond and an ester bond and an organic solvent (D-2) having a hydroxyl group.

Examples of the organic solvent (D-1) having no hydroxyl group and having an ether bond and an ester bond are: methyl cellosolve acetate, ethoxyethyl acetoacetate, ethylene glycol methyl ether propionate, ethylene glycol ethyl ether propionate, ethylene glycol methyl ether acetate, ethylene glycol ethyl ether acetate, diethylene glycol methyl ether acetate, diethylene glycol ethyl ether acetate, diethylene glycol-n-butyl ether acetate, propylene glycol methyl ether acetate (abbreviated as PGMEA), propylene glycol monoethyl ether acetate, propylene glycol propyl ether acetate (abbreviated as PGPEA), dipropylene glycol methyl ether acetate, dipropylene glycol ethyl ether acetate, 3-methoxy butyl acetate, or the like; preferably, methyl cellosolve acetate, propylene glycol methyl ether acetate, propylene glycol propyl ether acetate, or 3-methoxy butyl acetate.

The amount of the organic solvent (D-1) having no hydroxyl group and having an ether bond and an ester bond used is from 200 to 1,000 parts by weight; preferably, from 250 to 900 parts by weight; more preferably, from 300 to 800 parts by weight based on 100 parts by weight of the alkali-soluble resin (A) used. If the organic solvent (D-1) having no hydroxyl group and having an ether bond and an ester bond is absent, the compatibility is poor.

Examples of the organic solvent (D-2) having a hydroxyl group are: methyl lactate, ethyl lactate, butyl lactate, 2-hydroxy acid methyl isobutane, ethylene glycol monomethyl ether, diethylene glycol monoethyl ether (abbreviated as DGMEA), ethylene glycol mono propyl ether, ethylene glycol monobutyl ether, propylene glycol methyl ether (abbreviated as PGME), propylene glycol monoethyl ether, propylene glycol monopropyl ether, propylene glycol monobutyl ether, ethanol, propanol, butanol, 3-methoxy-1-butanol, hexanol, cyclohexanol, diacetone alcohol (abbreviated as AA), ethylene glycol, propylene glycol, or glycerin; preferably, propylene glycol methyl ether, ethyl lactate, 3-methoxy-1-butanol, or diacetone alcohol.

Furthermore, the boiling point of the organic solvent (D-2) having a hydroxyl group in the atmospheric pressure is 100° C. to 200° C. If the boiling point is too low, uneven coating film easily occurs after coated on a substrate. Preferably, the boiling point of the organic solvent (D-2) having a hydroxyl group in the atmospheric pressure is greater than or equal to 100° C.; more preferably is greater than 110° C.; still more preferably is greater than 115° C. In addition, if the boiling point is too high, the solvent easily remains in the coating film in the pre-baking Preferably, the boiling point of the organic solvent (D-2) having a hydroxyl group in the atmospheric pressure is less than or equal to 200° C.; more preferably is less than 180° C.; still more preferably is less than 175° C.

The amount of the organic solvent (D-2) having a hydroxyl group is from 10 to 1,000 parts by weight; preferably, from 30 to 900 parts by weight; more preferably, from 50 to 800 parts by weight based on 100 parts by weight of the alkali-soluble resin (A) used. If the organic solvent (D-2) having a hydroxyl group is absent, the compatibility is poor.

The ratio of the organic solvent (D-1) having no hydroxyl group and having an ether bond and an ester bond and the organic solvent (D-2) having a hydroxyl group is from 1 to 99, so that the compatibility is more satisfactory.

Other organic solvents may be applied are ether solvents, such as diethylene glycol dimethyl ether, diethylene glycol methyl ethyl ether, diethylene glycol diethyl ether, and tetrahydrofuran; ketone solvent, such as methyl ethyl ketone, cyclohexanone (abbreviated as CHE), 2-heptanone, and 3-heptanone; ester solvents, such as methyl 3-methoxypropionate, ethyl 3-methoxypropionate, methyl 3-ethoxypropionate, ethyl 3-ethoxypropionate (abbreviated as EEP), ethyl ethoxyacetate, 3-methyl 3-methoxybutyl acetate, 3-methyl 3-methoxybutyl propionate, ethyl acetate, n-butyl acetate, n-propyl acetate, isopropyl acetate, isobutyl acetate, n-amyl acetate, isoamyl acetate, n-butyl propionate, ethyl butyrate, n-propyl butyrate, isopropyl butyrate, n-butyl, methyl pyruvate, ethyl pyruvate, n-propyl pyruvate, methyl acetyl acetate, ethyl acetyl acetate, and ethyl 2-oxobutyrate; aromatic hydrocarbon solvents, such as toluene, and xylene; and carboxylic acid amide solvents, such as N-methylpyrrolidone, N,N-dimethyl formamide, and N,N-dimethyl acetamide or the like.

The aforesaid examples of the organic solvent (D) can be used alone or in admixture of two or more thereof. Preferably, the amount of the organic solvent (D) used is from 500 to 3,000 parts by weight based on 100 parts by weight of the alkali-soluble resin (A) used; more preferably, the amount of the organic solvent (D) used is from 800 to 2,800 parts; still more preferably, the amount of the organic solvent (D) used is from 1,000 to 2,500 parts.

The pigment (E) according to the present invention may be an inorganic pigment, organic pigments, or a combination thereof. The inorganic pigment is a metal compound such as a metal oxide or a metal complex salt; for example, an oxide of iron, cobalt, aluminum, cadmium, lead, copper, titanium, magnesium, chromium, zinc, antimony, or the like or a complex salt thereof.

Examples of the organic pigment are C.I. Pigment Yellow 1, 3, 11, 12, 13, 14, 15, 16, 17, 20, 24, 31, 53, 55, 60, 61, 65, 71, 73, 74, 81, 83, 93, 95, 97, 98, 99, 100, 101, 104, 106, 108, 109, 110, 113, 114, 116, 117, 119, 120, 126, 127, 128, 129, 138, 139, 150, 151, 152, 153, 154, 155, 156, 166, 167, 168, 175; C.I. Pigment Orange 1, 5, 13, 14, 16, 17, 24, 34, 36, 38, 40, 43, 46, 49, 51, 61, 63, 64, 71, 73; C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, 265; C.I. Pigment Violet 1, 19, 23, 29, 32, 36, 38, 39; C.I. Pigment Blue 1, 2, 15, 15:3, 15:4, 15:6, 16, 22, 60, 66; C.I. Pigment Green 7, 36, 37; C.I. Pigment Brown 23, 25, 28; C.I. Pigment Black 1, 7 or the like.

The aforesaid examples of the pigment (E) can be used alone or in admixture of two or more thereof. Preferably, the amount of the pigment (E) used is from 20 to 800 parts by weight based on 100 parts by weight of the alkali-soluble resin (A) used; more preferably, the amount of the pigment (E) used is from 40 to 600 parts; still more preferably, the amount of the pigment (E) used is from 600 to 400 parts.

The average particle diameter of the pigment (E) in the photosensitive resin composition for a color filter according to the invention is generally from 10 nm to 200 nm, preferably from 20 nm to 150 nm, more preferably from 30 nm to 130 nm.

As needed, the pigment (E) is accompanied by using a dispersing agent, such as a cationic, anionic, nonionic, amphoteric, fluorine-based or silicone-based surfactant.

Examples of the surfactant are polyoxyethylene alkyl ethers, such as polyoxyethylene dodecyl ether, polyoxyethylene stearyl ether and polyoxyethylene oleyl ether; polyoxyethylene phenyl ethers, such as polyoxyethylene n-octyl phenyl ether and polyoxyethylene n-nonylphenyl ether; polyoxyethylene dialkyl esters, such as polyoxyethylene dilaurate and polyoxyethylene distearate; sorbitol anhydride fatty acid esters; fatty acid modified polyesters; tertiary amine modified poly-amino acid esters; KP products of Shin-Etsu Chemical Industries, Ltd., SF-8427 manufactured by Toray Dow Corning Silicon, Polyflow products manufactured by Kyoeisha Yushi Kagaku Kogyo, F-Top product manufactured by Tochem Products Co., Ltd., Megafac products manufactured by Japanese ink chemical industry, Fluorade manufactured by Sumitomo 3M, Asahi Guard manufactured by Asahi Glass Company, Surflon manufactured by Asahi Glass Company.

Preferably, the photosensitive resin composition according to the present invention can contain additives (F) according to the specific requirements for the physical and/or chemical properties. The additives can be chosen by skilled artisans in the field. Examples of the additives are a compound (F-1) having two or more thiol groups in one molecule and other additives (F-2).

The compound (F-1) having two or more thiol groups in one molecule comprises a divergence configuration with respect to the thiol group of the α-position and/or β-position. Examples include but are not limited to 2,5-hexanedithiol, 2,9-decanedithiol, ethylene glycol bis(3-mercapto butyrate), butanediol bis(3-mercapto butyrate), octanediol bis(3-mercapto butyrate), trimethylolpropane tris(3-mercapto butyrate), pentaerythritol tetrakis(3-mercapto butyrate), ethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), ethylene glycol bis(2-mercaptoisobutyrate), butanediol bis(2-mercaptoisobutyrate), octanediol bis(2-mercaptoisobutyrate), trimethylolpropane tris(2-mercaptoisobutyrate), pentaerythritol tetrakis(2-mercaptoisobutyrate), ethylene glycol bis(3-mercaptovalerate), butanediol bis(3-mercapto valerate), octanediol bis(3-mercapto valerate), trimethylolpropanetris (3-mercapto valerate), pentaerythritol tetrakis(3-mercapto valerate), 1,4-bis(1-mercaptoethyl)benzene, (2-mercaptoethyl)benzene, phthalic acid bis(2-mercaptoethyl ester), phthalic acid bis(2-mercaptopropanyl ester), phthalic acid bis(2-mercaptobutanyl ester) or the like.

Preferably, the compound (F-1) having two or more thiol groups in one molecule is ethylene glycol bis(3-mercapto butyrate), butanediol bis(3-mercapto butyrate), octanediol bis(3-mercapto butyrate), trimethylolpropane tris(3-mercapto butyrate), pentaerythritol tetrakis(3-mercapto butyrate), ethylene glycol bis(2-mercaptoisobutyrate), butanediol bis(2-mercaptoisobutyrate), octanediol bis(2-mercaptoisobutyrate), trimethylolpropane tris(2-mercaptoisobutyrate), or pentaerythritol tetrakis(2-mercaptoisobutyrate); more preferably, ethylene glycol bis(3-mercapto butyrate) or butanediol bis(3-mercapto butyrate), and the polymerization initiation and the storage are better. The aforesaid examples of the compound (F-1) having two or more thiol groups in one molecule can be used alone or in admixture of two or more thereof.

Generally, the amount of the compound (F-1) having two or more thiol groups in one molecule used is from 1 to 100 parts by weight based on 100 parts by weight of the alkali-soluble resin (A) used, and the adhesion of subsequent formation of a pattern is good.

In another aspect, the other additives (F-2) further comprises surfactants, fillers, polymers other than the alkali-soluble resin (A), adhesion agents, antioxidants, UV absorbents, anti-coagulants, or the like.

Examples of the aforementioned surfactants are the same to the surfactants used accompanied with the pigment (E), and are not repeated again. The aforesaid examples of the surfactants can be used alone or in admixture of two or more thereof. The amount of the surfactants used is from 0 to 60 parts by weight; preferably from 0 to 4 parts by weight; more preferably from 0 to 3 parts by weight based on 100 parts by weight of the alkali-soluble resin (A) used, and the coating of the photosensitive composition for a color filter is improved.

In the preferred embodiment of the invention, the fillers include glass, alumina, or the like. Examples of the polymers other than the alkali-soluble resin (A) include polyvinyl alcohol, polyethylene glycol monoalkyl ether, polyfluoro alkyl acrylate, or the like. Examples of the adhesion agents include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidyloxypropyltrimethoxysilane, 3-glycidyloxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryl oxypropyltrimethoxysilane, 3-mercaptopropyltrimethoxysilane, or the like. Examples of the antioxidants include 2,2-thiobis(4-methyl-6-t-butylphenol), 2,6-di-t-butylphenol, or the like.

Examples of the UV absorbents include 2-(3-t-butyl-5-methyl-2-hydroxyphenyl)-5-chlorobenzotriazole, alkoxybenzophenone, or the like. Examples of the anti-coagulants include sodium polyacrylate, or the like.

Preferably, The other additives (F-2) are used in an amount ranging generally from 0 to 10 parts by weight, preferably from 0 to 6 parts by weight, and more preferably from 0 to 3 parts by weight, based on 100 parts by weight of the alkali-soluble resin (A).

The present invention also provides a method for manufacturing a color filter comprising forming a pattern with the photosensitive resin composition as mentioned above.

In one embodiment of the invention, the photosensitive resin composition in a liquid state for the color filter in the present invention can be formed by blending the alkali-soluble resin (A), the compound having an ethylenically unsaturated group (B), the photoinitiator (C), and the pigment (E) in the organic solvent (D) using a mixer, and the compound (F-1) having two or more thiol groups in one molecule and other additives (F-2) comprising surfactants, fillers, polymers other than the alkali-soluble resin (A), adhesion agents, antioxidants, UV absorbents, anti-coagulants, or the like are mixed if needed.

The amount of the compound having an ethylenically unsaturated group (B) used is from 10 to 500 parts by weight; the amount of the photoinitiator (C) used is from 2 to 200 parts by weight; the amount of the organic solvent (D) used is from 500 to 3,000 parts by weight; and the amount of the pigment (E) used is from 20 to 800 parts by weight based on 100 parts by weight of the alkali-soluble resin (A) used.

The manner for manufacturing the photosensitive resin composition for a color filter according to the invention can be carried out by skilled artisans in the field. For example, the pigment (E) can be added directly to the photosensitive resin composition for a color filter and dispersed, or a part of the pigment (E) is dispersed in a part of the alkali-soluble resin (A) and the organic solvent (D) first, to obtain a dispersion. Then, the compound having an ethylenically unsaturated group (B), the photoinitiator (C), and the remaining parts of the pigment (E), the alkali-soluble resin (A) and the organic solvent (D) are then mixed. The dispersing step of the pigment (E) can be carried out by mixing the above ingredients with a mixer such as a beads mill or a roll mill.

The present invention also provides a color filter manufactured by the method as mentioned above.

The manner for manufacturing the color filter by applying the photosensitive resin composition according to the invention can be coated on a substrate by a spin coating method, a cast coating method, a roller coating method, or the like, and is then dried under reduced pressure to remove most of the solvent. After completely evaporating the residual solvent by pre-baking, a coating film is formed. Operation conditions for the drying under reduced pressure and the pre-baking depend on kinds and amounts of the components used in the photosensitive resin composition. In general, the drying under reduced pressure is carried out at a pressure from 0 to 200 mm Hg for a period from 1 to 60 seconds. The pre-baking is carried out at a temperature from 70° C. to 110° C. for a period from 1 to 15 minutes. The coating film is then exposed to UV light through a specific photo mask, and is developed in a developer solution at a temperature of 23±2° C. for a period from 15 seconds to 5 minutes to dissolve and remove the unexposed portions of the coating film so as to obtain a desired pattern. The substrate with the desired pattern of the coating film is washed with water, is dried with compressed air or compressed nitrogen, and is heated at a temperature from 100 to 280° C. for a period of 1 to 15 minutes to remove undesired components to obtain the pattern. Preferably, the UV light used for the exposure of the coating film can be g line, h line, i line, or the like. The UV lamp for providing the UV light is a (ultra)high-pressure mercury lamp or a metal halide lamp.

The substrate used to form the color filter is made from bare glass, soda glass, Pyrex glass, silica glass, or any one of these glass coated with a transparent conductive film, or a transparent electrode substrate (such as a Si substrate) used in solid state image pick up devices. A black matrix is formed on the substrate to separate each color pixel element.

In one preferred embodiment of the invention, the developer solution is preferably an alkali aqueous solution of sodium hydroxide, potassium hydroxide, sodium carbonate, sodium hydrogencarbonate, potassium carbonate, potassium hydrogencarbonate, sodium silicate, sodium methylsilicate, aqueous ammonia, ethylamine, diethylamine, dimethyl ethanolamine, tetramethylammonium hydroxide, tetraethylammonium hydroxide, choline, pyrrole, piperidine, 1,8-diazabicyclo(5,4,0)-7-undecene, or the like. The concentration of the developer in the solution is from 0.001 wt % to 10 wt %, preferably from 0.005 wt % to 5 wt %, and more preferably from 0.01 wt % to 1 wt %. When applying the developer, the substrate with the desired pattern of the coating film is washed with water after the development, and then dried with compressed air or compressed nitrogen, and is heated at a temperature from 150 to 250° C. for a period of 5 to 60 minutes by a hot plate or for a period of 15 to 150 minutes by an oven.

The colored pixel layer (mainly comprising red, green and blue colors) can be obtained, similarly. Furthermore, an indium tin oxide (ITO) vapor deposition film is formed on the pixel layer under a vacuum environment of a temperature of 220° C. to 250° C. When necessary, the ITO film is further coated with polyimideimine for liquid crystal alignment membrane after etching and wiring, thereby firing, a color filter for a liquid crystal display device is obtained.

The present invention further provides a liquid crystal display device comprising the color filter as mentioned above.

According to the liquid crystal display device, a color filter substrate obtained as mentioned above and a driver substrate with a thin film transistor (TFT) substrate are disposed oppositely, and cell gap is disposed therebetween, and the two substrates are sealed with a sealing agent around the sites of the two substrates. Liquid crystals are then injected into the space defined by the surfaces of the substrates and the sealing agent, and the inject hole is further sealed to form liquid crystal cell. Then, a polarizer is adhered on the outer surface of the liquid crystal cell, i.e. on the other side of each substrate constituting the liquid crystal cell, and the liquid crystal display device is obtained.

The above mentioned liquid crystal (liquid crystal compound or liquid crystal composition) is not limited, and any liquid crystal compound or liquid crystal composition can be applied.

In addition, the above mentioned liquid crystal alignment membrane for aligning the direction of the liquid crystal is not limited, and an organic compound or an inorganic compound can be applied. The manner for forming the alignment membrane is known to artisans skilled in this field, and not the technical feature of the invention, and not illustrated herein.

The following examples are given for the purpose of illustration only and are not intended to limit the scope of the present invention.

EXAMPLE

Preparation of Polysiloxane (A-1-1)

A 500 ml three-necked flask was added with 100 g of propylene glycol monoethyl ether. The silane compound/ siloxane prepolymer solution and oxalic acid as shown in Table 1 were continually added with stirring at room temperature. The mixture in the flask was then stirred in an oil bath at a temperature of 30° C. for 30 minutes. The temperature of the oil bath was raised to 120° C. within a succeeding 30 minutes. After the inner temperature reached 105° C., the mixture in the flask was further stirred and heated for 6 hours to obtain the polysiloxane (A-1).

Preparations of Polysiloxanes (A-1-2) to (A-1-5)

The preparations of polysiloxanes (A-1-2) to (A-1-5) are similar to the preparation of polysiloxane (A-1-1), and the kind and amount of the silane compound/siloxane prepolymer were as shown in Table 1. The amount of oxalic acid, reaction temperature and the reaction time of the polycondensation differed from those of the preparation of polysiloxane (A-1-1) and were also shown in Table 1, and polysiloxanes (A-1-2) to (A-1-5) were obtained.

The contents in the four-necked conical flask were stirred while the temperature of an oil bath was raised to 100° C. As shown in Table 2, the monomer mixture was added continuously in the four-necked conical flask and mixed, and the temperature of an oil bath was raised to 100° C. Furthermore, 4 parts by weight of 2,2'-azobis-2-methyl butyronitrile (referred to as AMBN hereinafter, as a polymerization initiator) dissolved in EEP was added into the four-necked conical flask in five aliquots within one hour.

Polymerization was conducted at 100° C. for 6 hours. Polymerization product was removed from the four-necked conical flask after the polymerization was complete. The solvent was evaporated so as to obtain the acrylic resin (A-2-1).

TABLE 1

Contents of preparation of polysiloxane (A-1)

| | Composition | | | | | | | | |
|---|---|---|---|---|---|---|---|---|---|
| | Silane Compound/Siloxane prepolymer (mol) | | | | | Catalyst (g) | | Temp. | Time |
| Preparation | MTMS | DMDMS | PTMS | TMSG | GF-20 | X-12-967 | water | Oxalic acid | (° C.) | (hour) |
| A-1-1 | | 0.23 | 0.70 | | | 0.07 | 75 | 0.35 | 105 | 6 |
| A-1-2 | | 0.70 | 0.15 | 0.12 | 0.03 | | 75 | 0.40 | 110 | 5 |
| A-1-3 | 0.50 | | 0.35 | | | 0.15 | 75 | 0.40 | 105 | 6 |
| A-1-4 | 0.72 | | 0.16 | | 0.09 | 0.03 | 75 | 0.35 | 110 | 6 |
| A-1-5 | 0.81 | | 0.19 | | | | 75 | 0.35 | 110 | 6 |

MTMS: Methyltrimethoxysilane
DMDMS: Dimethyldimethoxysilane
PTMS: Phenyltrimethoxysilane
TMSG: 3-trimethoxysilylpropyl glutaric anhydride
GF-20: 3-(Triethoxysilyl)propyl succinic anhydride
X-12-967: 3-(Trimethoxysilyl)propyl succinic anhydride Preparation of Acrylic Resin (A-2-1)

A 1000 ml four-necked conical flask equipped with a nitrogen inlet, a stirrer, a heater, a condenser and a thermometer was purged with nitrogen, and the contents and the solvent ethyl 3-ethoxypropionate as shown in Table 2 were added, and the monomer mixture was added continuously.

Preparations of Acrylic Resins (A-2-2) to (A-2-4)

The preparations of acrylic resins (A-2-2) to (A-2-5) are similar to the preparation of acrylic resin (A-2-1), and the kind and amount of the monomer were as shown in Table 2. The acrylic resins (A-2-2) to (A-2-4) were obtained.

TABLE 2

Contents of Preparation of acrylic resin (A-2)

| | Composition (parts by weight) | | | | | | | | | Reaction | Reaction |
|---|---|---|---|---|---|---|---|---|---|---|---|
| Preparation | Monomer for polymerization | | | | | | | Initiator | Solvent | Temperature | Time |
| Example | MAA | AA | BzMA | FA-512A | MA | MMA | SM | AMBN | EEP | (° C.) | (hour) |
| A-2-1 | 15 | 10 | 45 | 10 | | 20 | | 6 | 200 | 100 | 6 |
| A-2-2 | 15 | | 60 | 10 | | | 15 | 6 | 200 | 100 | 6 |
| A-2-3 | | 20 | | | 30 | | 50 | 6 | 200 | 100 | 6 |
| A-2-4 | 10 | 15 | | 10 | 15 | | 50 | 6 | 200 | 100 | 6 |

MAA: Methacrylic acid
AA: Acrylic acid
BzMA: Benzyl methacrylate acrylate
FA-512A: Dicyclopentenyloxyethyl
MA: Methyl acrylate
MMA: Methyl methacrylate
SM: Styrene
AMBN: 2,2'-Azobis-2-methyl butyronitrile
EEP: Ethyl 3-ethoxypropionate Examples of Photosensitive Resin Composition:

The compositions and amounts shown in Table 3 were mixed and dissolved using a shaker to obtain a photosensitive resin composition for a color filter.

Comparative Examples of Photosensitive Resin Composition:

The compositions and amounts shown in Table 4 were mixed and dissolved using a shaker to obtain a photosensitive resin composition for a color filter.

Assays

1. Development (Development Speed)

The photosensitive resin compositions of the examples and comparative examples were spin-coated on a glass substrate (100 mm×100 mm), dried under a pressure of 100 mmHg for 30 seconds, and were pre-baked at a temperature of 80° C. for 3 minutes to form a pre-baked film having a thickness of 1.0 μm.

The pre-baked film was dropped with 2-mL of 2 wt % of potassium hydroxide solution and the time required for dissolving was evaluated. The time required was assayed as the development speed. The criteria are as follows.

○: time required for development <10 sec

Δ: 10 sec≤time required for development <15 sec

X: time required for development ≥15 sec

The results of development are shown in Tables 3 and 4.

2. Compatibility

The value of the CIE chromaticity coordinates (x, y) and luminance Y value of the obtained color liquid crystal display device were evaluated with the colorimeter (manufactured by Otsuka Electronics Co., Model: MCPD) with 2 degree field. The Y value was taken as the evaluation standard of compatibility.

○: Y≥68;

Δ: 58≤Y<68;

X: Y<58.

The results of compatibility are shown in Tables 3 and 4.

TABLE 3

Contents and Assays of Examples of the Photosensitive Resin Composition

| Components | | | Examples | | | | | | | | |
|---|---|---|---|---|---|---|---|---|---|---|---|
| | | | 1 | 2 | 3 | 4 | 5 | 6 | 7 | 8 | 9 |
| alkali-soluble resin (A)(parts by weight) | A-1 | A-1-1 | 5 | | | | 30 | | | | |
| | | A-1-2 | | 20 | | | | 20 | | 50 | |
| | | A-1-3 | | | 40 | | | | 10 | | 100 |
| | | A-1-4 | | | | 70 | | | | | |
| | | A-1-5 | | | | | | | | | |
| | A-2 | A-2-1 | 95 | | | | | | | | |
| | | A-2-2 | | 80 | | | 70 | | | | |
| | | A-2-3 | | | 60 | | | 80 | | 50 | |
| | | A-2-4 | | | | 30 | | | 90 | | |
| compound having an ethylenically unsaturated group (B)(parts by weight) | B-1 | | 120 | 120 | 150 | 150 | 200 | | | 100 | 100 |
| | B-2 | | | | | | | 200 | 150 | 20 | 50 |
| photoinitiator (C)(parts by weight) | C-1 | | 40 | 40 | 50 | 50 | | | | 50 | 50 |
| | C-2 | | | | | | 60 | | 60 | 10 | |
| | C-3 | | | 10 | | 20 | | 40 | | 10 | 10 |
| organic solvent (D)(parts by weight) | D-1 | D-1-1 | 900 | | | | 500 | | | | |
| | | D-1-2 | | 800 | | | | 990 | | | 950 |
| | | D-1-3 | | | 980 | 100 | | | 400 | | |
| | | D-1-4 | | | | 500 | | | | 1000 | |
| | D-2 | D-2-1 | 100 | | | | 300 | 10 | | | |
| | | D-2-2 | | | | | | | | | |
| | | D-2-3 | | 200 | 20 | | 200 | | 600 | | 50 |
| | | D-2-4 | | | | 400 | | | | 10 | |
| | D-3 | | | | | | | | | | |
| Weight ratio of (D-1)/(D-2) | | | 9.0 | 4.0 | 49.0 | 1.5 | 1.0 | 99 | 1 | 100 | 19 |
| pigment (E)(parts by weight) | E-1 | | 190 | | | | 75 | | | 220 | |
| | E-2 | | | 180 | | | | 60 | | | 130 |
| | E-3 | | | | 120 | | | | | | |
| | E-4 | | | | | 90 | | | 100 | | |
| Assay | Development speed | | ○ | ○ | ○ | ○ | ○ | ○ | ○ | ○ | Δ |
| | Compatibility | | ○ | ○ | ○ | ○ | ○ | ○ | Δ | Δ | ○ |

| Abbreviation | | Name |
|---|---|---|
| B-1 | DPCA-60 | |
| B-2 | DPHA | Dipentaerythritol hexaacrylate |
| C-1 | Irgacure 369 | 2-benzyl-2-N,N-dimethylamino-1-(4-morpholinophenyl)-1-butanone |
| C-1 | Irgacure 907 | 2-methyl-1-(4-methylthiophenyl)-2-morpholino-1-propanone |
| C-3 | EABF | 4,4'-bis(diethylamino)benzophenone |
| D-1-1 | MCA | Methyl cellosolve acetate |
| D-1-2 | PGMEA | Propylene glycol methyl ether acetate |
| D-1-3 | PGPEA | Propylene glycol propyl ether acetate |

TABLE 3-continued

| | | |
|---|---|---|
| D-1-4 | EEP | Ethyl 3-ethoxypropionate |
| D-2-1 | EGMME | Ethylene glycol monomethyl ether |
| D-2-2 | DAA | Diacetone alcohol |
| D-2-3 | DGMEA | Diethylene glycol monoethyl ether |
| D-2-4 | PGME | Propylene glycol methyl ether |
| D-3 | CHE | Cyclohexanone |
| E-1 | C.I. Pigment R254/C.I. Pigment Y139 = 80/20 | |
| E-2 | C.I. Pigment G36/C.I. Pigment Y150 = 60/40 | |
| E-3 | C.I. Pigment B15:6 | |
| E-4 | C.I. Pigment BK7 | |

TABLE 4

Contents and Assays of Comparative Examples of the Photosensitive Resin Composition

| Components | | | Comparative Examples | | | | | |
|---|---|---|---|---|---|---|---|---|
| | | | 1 | 2 | 3 | 4 | 5 | 6 |
| alkali-soluble resin (A)(parts by weight) | A-1 | A-1-1 | | | | | | |
| | | A-1-2 | | | | | | 70 |
| | | A-1-3 | | | | 50 | 60 | |
| | | A-1-4 | | | 50 | | | |
| | | A-1-5 | | 100 | | | | |
| | A-2 | A-2-1 | 100 | | | | | |
| | | A-2-2 | | | | 50 | | |
| | | A-2-3 | | | 50 | | | 30 |
| | | A-2-4 | | | | | 40 | |
| compound having an ethylenically unsaturated group (B)(parts by weight) | B-1 | | 120 | | 120 | 120 | 120 | 120 |
| | B-2 | | | 150 | | | | |
| photoinitiator (C)(parts by weight) | C-1 | | 40 | 40 | 40 | | 40 | 40 |
| | C-2 | | | | | 50 | | |
| | C-3 | | 10 | | | | | |
| organic solvent (D)(parts by weight) | D-1 | D-1-1 | | | | | | |
| | | D-1-2 | | | | | 1000 | |
| | | D-1-3 | | 970 | | | | |
| | | D-1-4 | 800 | | | | | |
| | D-2 | D-2-1 | 200 | 30 | | | | |
| | | D-2-2 | | | 1000 | | | |
| | | D-2-3 | | | | 1000 | | |
| | | D-2-4 | | | | | | |
| | D-3 | | | | | | | 1000 |
| Weight ratio of (D-1)/(D-2) | | | 4 | 32 | 0 | 0 | — | — |
| pigment (E)(parts by weight) | E-1 | | | 190 | | | | 200 |
| | E-2 | | 180 | | | 180 | | |
| | E-3 | | | | 200 | | | |
| | E-4 | | | | | | 200 | |
| Assay | Development speed | | X | X | ○ | ○ | ○ | ○ |
| | Compatibility | | ○ | ○ | X | X | X | X |

| Abbreviation | | Name |
|---|---|---|
| B-1 | DPCA-60 | |
| B-2 | DPHA | Dipentaerythritol hexaacrylate |
| C-1 | Irgacure 369 | 2-benzyl-2-N,N-dimethylamino-1-(4-morpholinophenyl)-1-butanone |
| C-1 | Irgacure 907 | 2-methyl-1-(4-methylthiophenyl)-2-morpholino-1-propanone |
| C-3 | EABF | 4,4'-bis(diethylamino)benzophenone |
| D-1-1 | MCA | Methyl cellosolve acetate |
| D-1-2 | PGMEA | Propylene glycol methyl ether acetate |
| D-1-3 | PGPEA | Propylene glycol propyl ether acetate |
| D-1-4 | EEP | Ethyl 3-ethoxypropionate |
| D-2-1 | EGMME | Ethylene glycol monomethyl ether |
| D-2-2 | DAA | Diacetone alcohol |
| D-2-3 | DGMEA | Diethylene glycol monoethyl ether |
| D-2-4 | PGME | Propylene glycol methyl ether |
| D-3 | CHE | Cyclohexanone |

TABLE 4-continued

| | |
|---|---|
| E-1 | C.I. Pigment R254/C.I. Pigment Y139 = 80/20 |
| E-2 | C.I. Pigment G36/C.I. Pigment Y150 = 60/40 |
| E-3 | C.I. Pigment B15:6 |
| E-4 | C.I. Pigment BK7 |

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A photosensitive resin composition comprising:
an alkali-soluble resin (A);
a compound having an ethylenically unsaturated group (B);
a photoinitiator (C);
an organic solvent (D); and
a pigment (E);
wherein the alkali-soluble resin (A) comprises a polysiloxane (A–1), and the polysiloxane (A–1) is obtained by hydrolyzing and condensing a silane compound represented by Formula (1);

$$Si(R^a)_z(OR^b)_{4-z} \quad \text{Formula (1)}$$

wherein:
at least one of $R^a$ represents an alkyl group or alkoxyl group having an epoxy-substituted group or a carboxylic acid anhydride substituent; and the other Ra is independently selected from the group consisting of a hydrogen atom, a $C_1$-$C_{10}$ alkyl group, a $C_2$-$C_{10}$ alkenyl group, and a $C_6$-$C_{15}$ aryl group;
$R^b$ is independently selected from the group consisting of a hydrogen atom, a $C_1$-$C_6$ alkyl group, a $C_1$-$C_6$ acyl group, and a $C_6$-$C_{15}$ aryl group; and
z represents an integer from 1 to 3; and
the organic solvent (D) comprises an organic solvent (D-1) having no hydroxyl group and having an ether bond and an ester bond and an organic solvent (D-2) having a hydroxyl group.

2. The photosensitive resin composition according to claim 1, wherein the amount of the polysiloxane (A-1) used is from 5 to 70 parts by weight based on 100 parts by weight of the alkali-soluble resin (A) used.

3. The photosensitive resin composition according to claim 1, wherein the alkali-soluble resin (A) further comprises an acrylic resin (A-2).

4. The photosensitive resin composition according to claim 3, wherein the amount of the acrylic resin (A-2) used is from 30 to 95 parts by weight based on 100 parts by weight of the alkali-soluble resin (A) used.

5. The photosensitive resin composition according to claim 1, wherein the amount of the organic solvent (D–1) having no hydroxyl group and having an ether bond and an ester bond used is from 200 to 1000 parts by weight; the amount of the organic solvent (D-2) having a hydroxyl group used is from 10 to 1000 parts by weight based on 100 parts by weight of the alkali-soluble resin (A) used.

6. The photosensitive resin composition according to claim 5, wherein the weight ratio of the amount of the organic solvent (D-1) having no hydroxyl group and having an ether bond and an ester bond used to the amount of the organic solvent (D-2) having a hydroxyl group used is from 1 to 99.

7. The photosensitive resin composition according to claim 1, wherein the amount of the compound having an ethylenically unsaturated group (B) used is from 10 to 500 parts by weight; the amount of the photoinitiator (C) used is from 2 to 200 parts by weight; the amount of the organic solvent (D) used is from 500 to 3,000 parts by weight; and the amount of the pigment (E) used is from 20 to 800 parts by weight based on 100 parts by weight of the alkali-soluble resin (A) used.

8. A method for manufacturing a color filter comprising forming a pattern with the photosensitive resin composition according to claim 1.

9. The method according to claim 8, wherein the amount of the polysiloxane (A-1) used is from 5 to 70 parts by weight based on 100 parts by weight of the alkali-soluble resin (A) used.

10. The method according to claim 8, wherein the alkali-soluble resin (A) further comprises an acrylic resin (A-2).

11. The method according to claim 10, wherein the amount of the acrylic resin (A-2) used is from 30 to 95 parts by weight based on 100 parts by weight of the alkali-soluble resin (A) used.

12. The method according to claim 8, wherein the amount of the organic solvent (D-1) having no hydroxyl group and having an ether bond and an ester bond used is from 200 to 1000 parts by weight; the amount of the organic solvent (D-2) having a hydroxyl group used is from 10 to 1000 parts by weight based on 100 parts by weight of the alkali-soluble resin (A) used.

13. The method according to claim 12, wherein the weight ratio of the amount of the organic solvent (D-1) having no hydroxyl group and having an ether bond and an ester bond used to the amount of the organic solvent (D-2) having a hydroxyl group used is from 1 to 99.

14. The method according to claim 8, wherein the amount of the compound having an ethylenically unsaturated group (B) used is from 10 to 500 parts by weight; the amount of the photoinitiator (C) used is from 2 to 200 parts by weight; the amount of the organic solvent (D) used is from 500 to 3,000 parts by weight; and the amount of the pigment (E) used is from 20 to 800 parts by weight based on 100 parts by weight of the alkali-soluble resin (A) used.

15. A color filter manufactured by the method according to claim 8.

16. A liquid crystal display device comprising the color filter according to claim 15.

* * * * *